United States Patent [19]
Saraga et al.
[11] 3,899,771
[45] Aug. 12, 1975

[54] METHOD OF CHARACTER RECOGNITION BY LINEAR TRAVERSE EMPLOYING SHIFTED EDGE LINES

[75] Inventors: Peter Saraga; Peter Roy Wavish, both of Salfords, near Redhill, England

[73] Assignee: U.S. Philips Corporation, New York, N.Y.

[22] Filed: June 17, 1974

[21] Appl. No.: 479,904

Related U.S. Application Data

[63] Continuation of Ser. No. 281,344, Aug. 17, 1972, abandoned.

[30] Foreign Application Priority Data

Aug. 17, 1971 United Kingdom ............... 38528/71
Aug. 17, 1971 United Kingdom ............... 38527/71
Mar. 1, 1972 United Kingdom ................ 9488/72

[52] U.S. Cl. ............. 340/146.3 AE; 340/146.3 MA
[51] Int. Cl. ............................................ G06k 9/16
[58] Field of Search ......... 340/146.3 AE, 146.3 AC, 340/146.3 R, 146.3 AQ, 146.3 MA

[56] References Cited

UNITED STATES PATENTS 3,609,685 9/1971 Deutsch .................... 340/146.3 AE
3,766,520 10/1973 Patterson .................. 340/146.3 AE

OTHER PUBLICATIONS

Kuhl, "Classification and Recognition of Hand—Printed Characters," *IEEE Int. Convention Record*, 1963, pp. 75–93 (Part 4).

*Primary Examiner*—Leo H. Boudreau
*Attorney, Agent, or Firm*—Frank R. Trifari

[57] ABSTRACT

A method of recognizing characters of varying stroke width by linear traverse is disclosed. A character is stored in a matrix of electrical storage cells with character cell positions distinguished from background cell positions by the presence of digital signals. A stored character is examined by using a predetermined group form (for example, a 2 × 2 square, a cruciform, a triangle or a 4 × 4 square) to sense for predetermined form characteristics (for example, two adjacent character cell positions of a 2 × 2 square) to generate a shifted edge line lying between character cell positions and adjacent background cell positions. The shifted edge line of the character defined by directional vectors is then compared with standard combinations in order to recognize the character.

11 Claims, 29 Drawing Figures

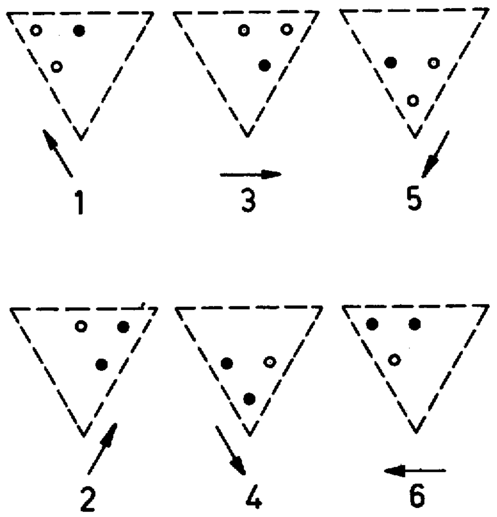
Fig.17
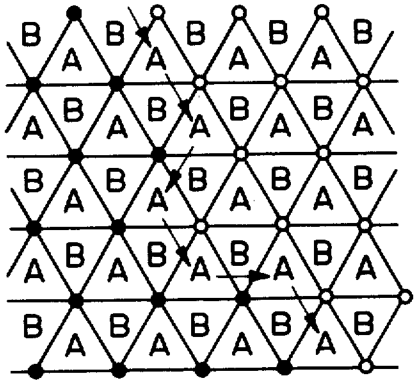
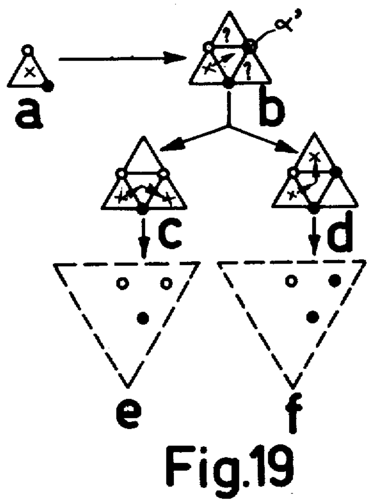
Fig.18 Fig.19
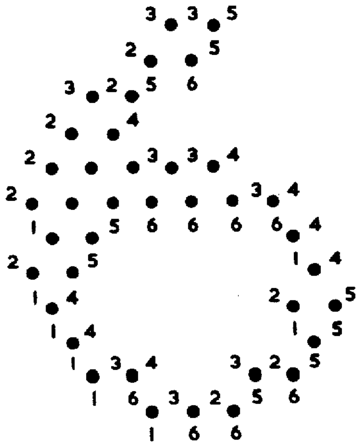
Fig.20

METHOD OF CHARACTER RECOGNITION BY LINEAR TRAVERSE EMPLOYING SHIFTED EDGE LINES

This is a continuation of application Ser. No. 281,344, filed Aug. 17, 1972, now abandoned.

In "Electronics Letters" of July 15, 1971 (vol. 7, No. 14, pp. 385–387) Walbrook and Woollons described a two-dimensional parallel processing computer and suggested operators for the edge coding of binary-digitized patterns such as characters. A first object of the present invention is to provide alternate operators which have certain improved properties.

In systems for parallel information processing it is necessary to associate and unambiguous directional code with each edge point. According to the known method, the edge of a black part in a white area is defined by the outermost points in the black part. This means that black points (character positions) lying on a line segment having a width of only one point cannot be unambiguously coded since the two edges of the line segment coincide. Character edges can thus be lost.

This drawback is eliminated according to the invention by defining the edge line such that it lies between the outermost character positions and the background positions adjacent thereto. A character segment which has a thickness of only one position is thus given two separately extending edges. The edge line can thus be composed of a succession of edge points which are linked by the elemental vectors which have the direction indicated by the edge directional information.

The positions are arranged in rows and columns. The operator figure contains as the said combinations, four positions, the edge directional information being directed parallel to the connection line through the two character positions in the case of two adjoining character positions and the presence of two background positions, and directed along the diagonal of the operator figure formed by two background positions in the case of only one character position. In this way a very simple construction is obtained which satisfies the requirements imposed. The eight directions of the edge directional information can be chosen in accordance with a cyclic sequence. It will appear that the edge line sometimes passes through background positions, but then a smoother edge is obtained anyway. A more precise definition of the edge line is then that it links the centers of all matrix cells (i.e. operator figures) which contain either one character position or two adjacently arranged character positions (i.e. not in a diagonally opposed arrangement).

It is a further aspect of the invention that said edge directional information is directed by said set of operator information towards the center of the adjoining operator figure for which the said equality occurs. By increasing the number of positions in an operator figure so that it already partly represents an adjoining operator figure as if it were, it can be indicated with certainty that said adjoining operator figure will produce edge point information. This is due to the fact that the edge line to the center part of the adjoining operator departs from the center part of the relevant operator.

In the case of a hexagonal pattern, it is a further aspect of the invention that said operator figure comprises six positions which are arranged in a triangle and said combinations comprise three positions which are arranged in correspondingly orientated triangles, the said edge point information being generated if a combination comprises at least one character position and at least one background position, the two positions of the combination which are situated nearest to said center being of a different nature, said edge directional information being directed parallel to the two correspondingly denoted positions of said combination. In this context the term "hexagonal" is to be understood to mean no more than that each position has six neighbours which, however, need not all be situated at the same distance. In this manner the objects of the invention are readily realized. This simplicity can be realized particularly in the case of a hexagonal pattern.

In the case of positions which are arranged in rows and columns, it is an advantageous aspect of the invention that the operator figure comprises 12 positions which are arranged according to a 4 × 4 matrix — minus the four corner positions —, the combinations consisting of five positions which are arranged therein in the form of a cross- edge point information. This information is generated if, during a counter-clockwise cycle along the three positions situated inside the combination and forming part of the central four positions of the operator figure, one character position and two background positions are successively found, the edge directional information being directed transverse to the connection line of the two background positions if the combination contains no further background positions. The edge directional information is directed parallel to the line if the combination comprises three background positions which are arranged on one line, the edge directional information otherwise being directed from said center towards the central position of the combination. The operator now contains twelve positions, but thereby said edge directional information is obtained perfectly. In contrast with the combinations according to the known method, the central position of a combination is always a background position according to the present invention. It is obvious that "clockwise" can also be "counter-clockwise" in all cases.

In the case of positions which are arranged in rows and columns, it is a further advantageous aspect of the invention that the operator figure comprises a 4 × 4 matrix of positions which are consecutive numbered from 1 to 16 in rows and columns. The value 1 is assigned to a character position and the value 0 to a background position. The said directional information is directed towards the position 1 if the function $(1 + \overline{5}).2.\overline{3}.\overline{6}.7.(\overline{10} + 11)$ is "true;" the said directional information being directed towards the center between the positions 2 and 3 if the function $(\overline{2} + 3).6.7.(\overline{10} + 11)$ is "true;" the said directional information being directed towards the center between the positions 2 and 3 if the function $(2 + \overline{6})3.\overline{4}.\overline{7}.8.(\overline{6}+10).\ .11.\overline{12}$ is "true;" an isolated edge point being found if the function $(\overline{2}.3.\overline{4}.6.\overline{7}.8.10.11.\overline{12})$ is "true". Other isolated edge points and directional inforamtion is found by the cyclic changing of the axis directions and the position combinations. This is an alternative operator by which the edge of a character is also perfectly defined. The symmetry of the combinations can again be chosen to be opposite so that the following pairs of positions are changed over: 1–4, 2–3, 5–8, 6–7, 9–12, 10–11, 13–16, 14–15.

It is a further advantageous aspect of the invention that after the finding of edge point information the operator figure is shifted over a position distance in accordance with the edge directional information found. As a result, the entire edge, constituting a closed figure, is successively traced.

The invention also relates to a device to be used for determining the edge of a character, the said characters being applied on a carrier, comprising a detector which images the information of the characters on a provided store so that said characters are stored in the form of digital information of character positions and background positions, respectively. The positions are arranged on the carrier in accordance with a two-dimensional regular pattern of positions, it being possible to apply the information of positions which are arranged together in accordance with an operator figure to an edge point determining unit which comprises edge point determining devices. It is possible to apply the information of said positions, present in even numbers in the operator figure, to at least one edge determining device, each edge determining device being capable of generating one edge point information and one edge directional information per operator figure which can be applied to a store. The method according to the invention is thus readily implemented.

A further aspect according to the invention is that the information of the positions which are arranged inside one operator figure can be collectively addressed by a control unit, it being possible to apply said edge directional information to the control unit so as to control the addressing of the information of a subsequent operator figure. The edge of the character is thus followed automatically.

The invention will now be described in detail, by way of example, with reference to the accompanying diagrammatic drawings, in which.

Figure 9:
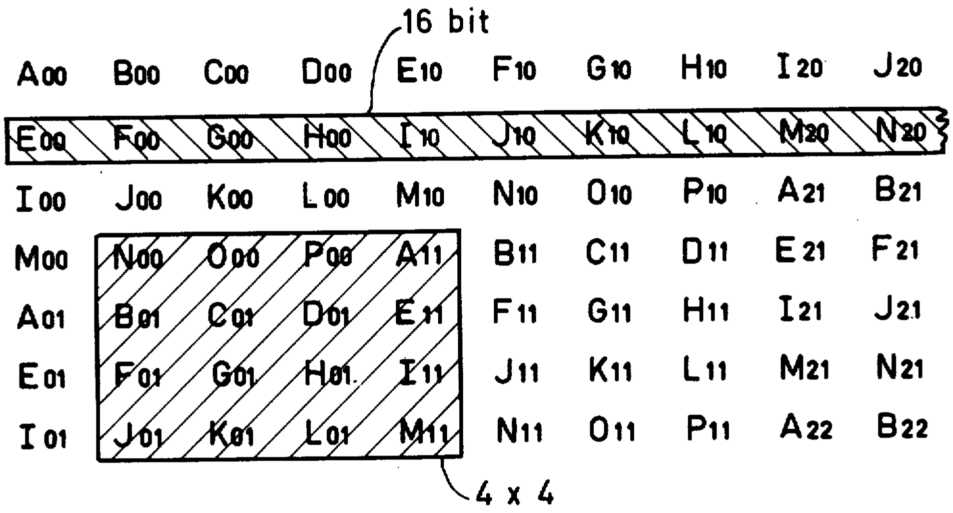
FIG. 9 shows part of a store which is an alternative to the store of FIG. 7.
Figure 11:
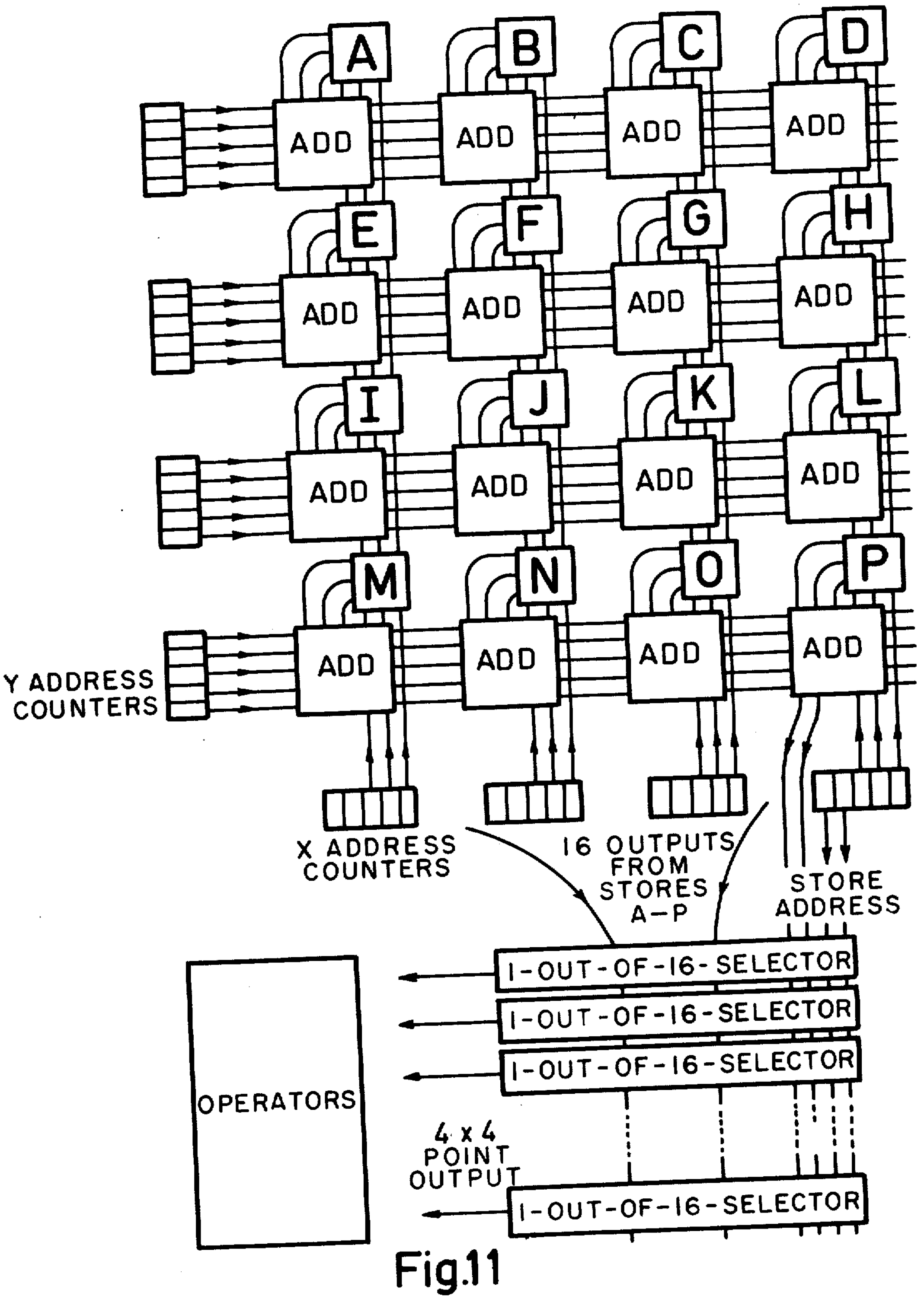

FIG. 11 shows a read-out system for the storage arrangement of FIG. 9. In this arrangement five horizontal address lines are common to four adders of a row. Two vertical address lines are common to the four adders and four stores in a column. One vertical address line is common to the four stores in a column. Three outputs from each adder acts as inputs to the respective store. The 16 outputs from the stores to the 1-out-of-16 selectors are common to all 16 selectors.

Figure 5:
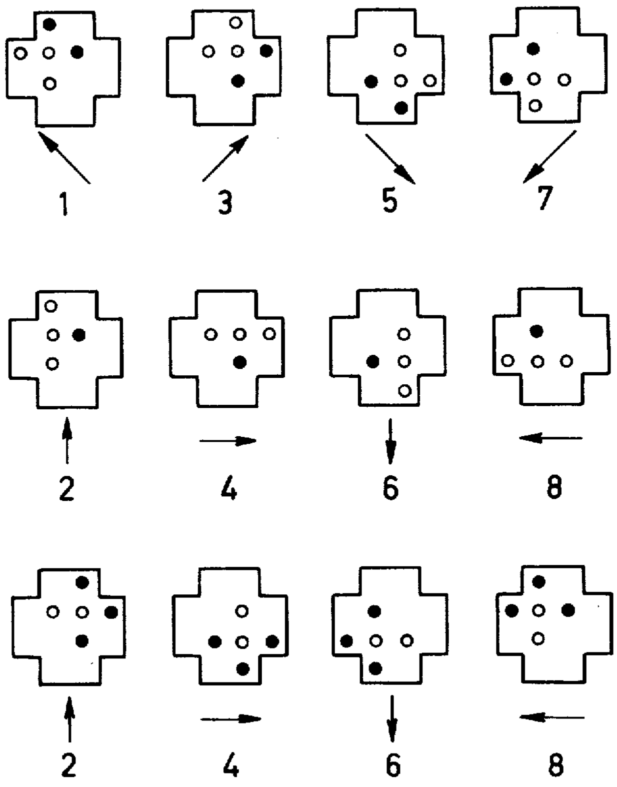
FIG. 5 shows a cruciform operator figure comprising 12 positions in which twelve combinations of position information are operative as operators.
Figure 7:
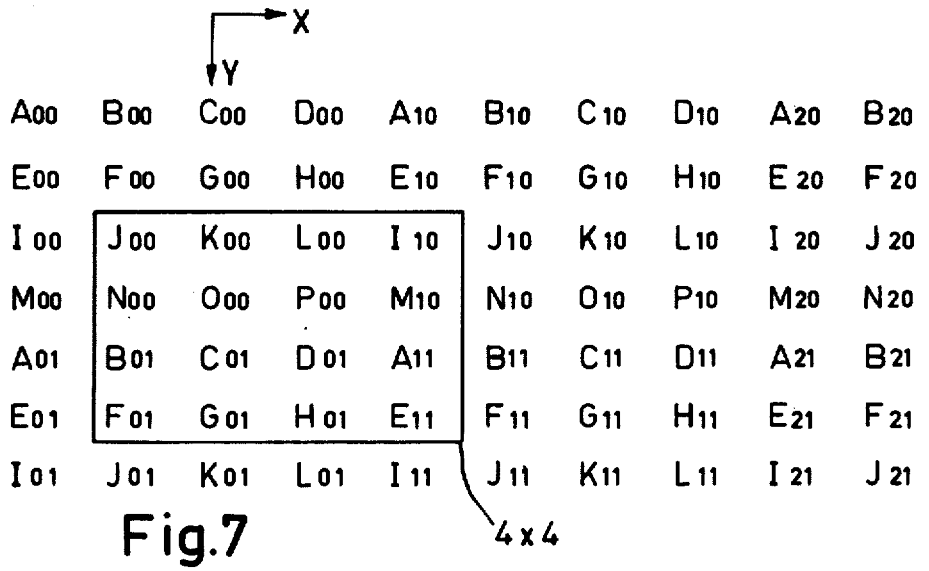
FIG. 7 shows part of a storage array.
Figures 12, 13:
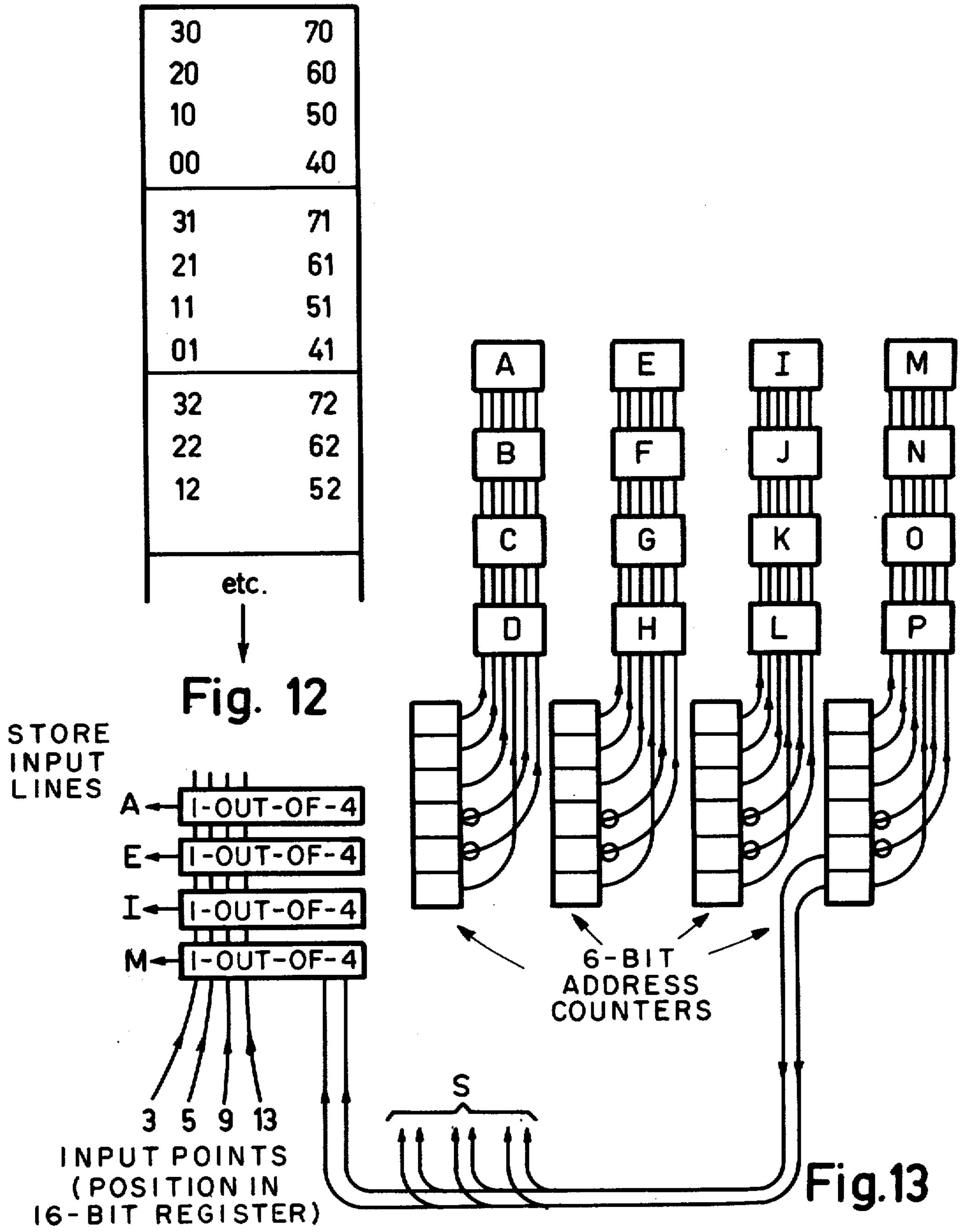
Figure 14:
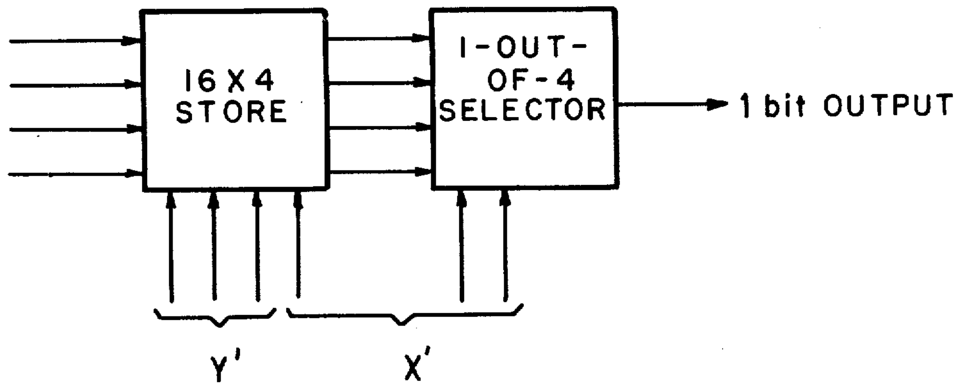
Figure 15:
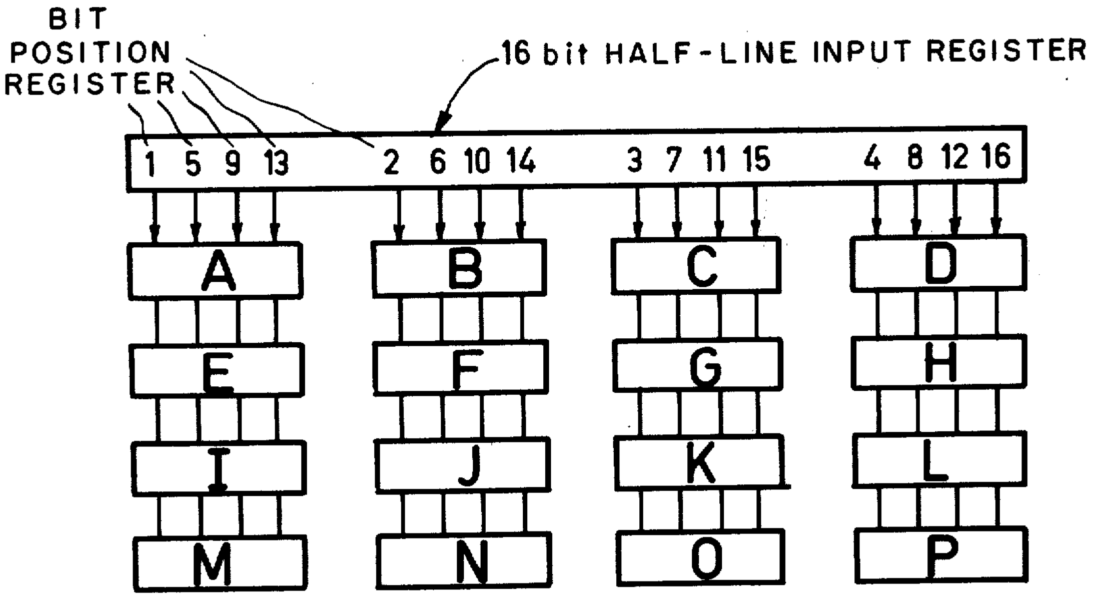
Figure 16A:
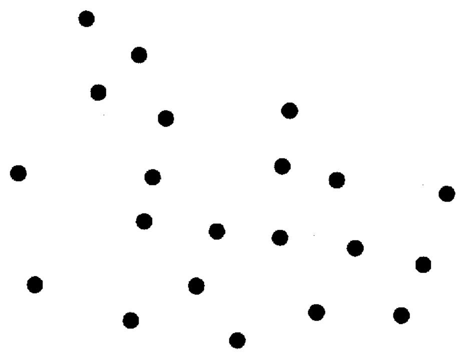
Figure 16B:
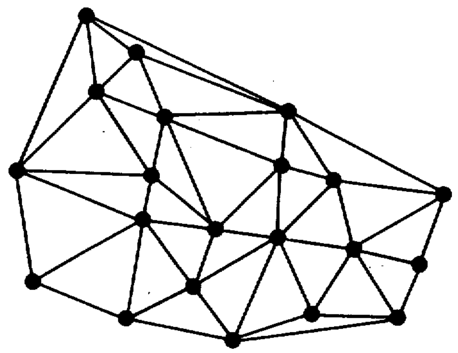
Figure 21:
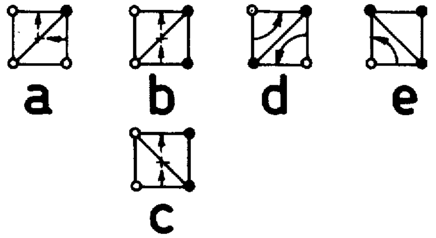
Figure 22:
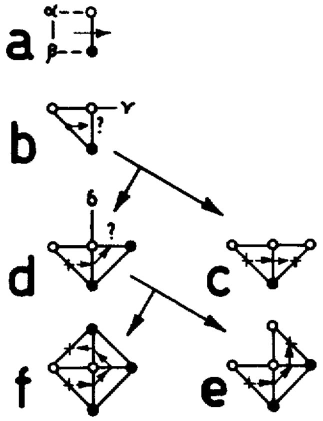
Figure 23:
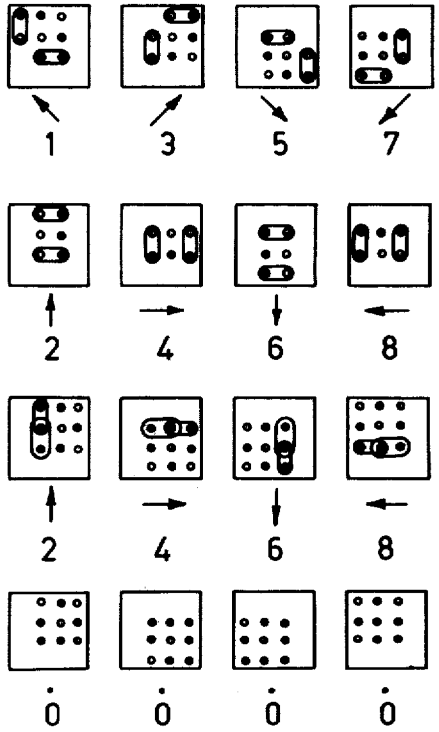
Figure 24:
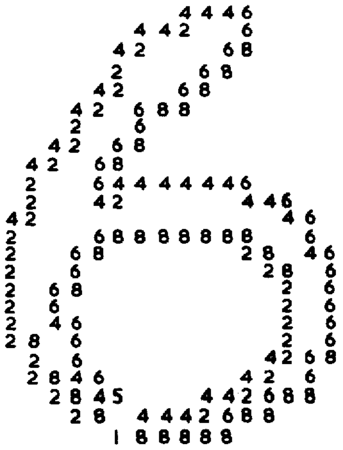

FIG. 12 gives bit addresses required for the store P of FIG. 11 (16 × 1 read-in/read-out);

FIG. 13 illustrates the read-in for the half-line Eoo—Foo etc. shown in FIG. 9 (six address lines are common to four stores);

FIG. 14 shows a 64-bit store unit for an alternative arrangement of 4 × 4 operator and 16 × 1 half-line input;

FIG. 15 shows a half-line read-in to the array associated with the arrangement of FIGS. 7 and 14 (all the vertical lines are data lines and each set of four is common to four stores);

FIGS. 16*a*–16*b* show edge tracing in an array of randomly positioned points;

FIG. 17 shows hexagonal edge tracing operators;

FIG. 18 shows the position of the edge in a hexagonal array (shaded triangles are edge triangles);

FIG. 19 shows the synthesis of operators of FIG. 17;

FIG. 20 shows a hexagonal pattern and the corresponding edge coding;

FIG. 21 shows the application of priority rules in a rectangular array;

FIG. 22 shows the synthesis of rectangular operators of FIG. 5;

FIG. 23 shows rectangular edge coding operators II ⓐⓑ = *a* or *b*;

FIG. 24 shows edge coding produced by rectangular operators of FIG. 23.

Figure 1:
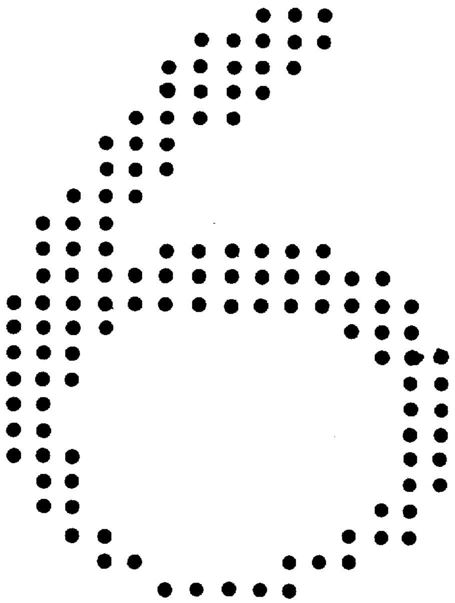
FIG. 1 shows a binary digitized character.
Figure 2:
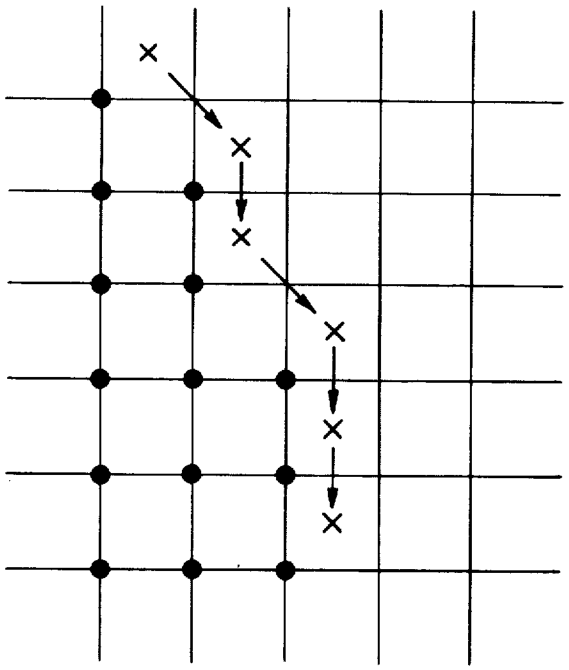
FIG. 2 shows edge tracing in between white points and black points.

FIG. 1 shows an example of a binary digitized character. The background positions have been omitted. The lower side of the character has a thickness of only one character position. The known method would therefore produce two coinciding edges at this area. According to the present invention the edge is defined such that it extends in fact between the outermost black points (character positions) and the white points (background positions) adjacent thereto. FIG. 2 shows an application of this principle for a square (rectangular) character matrix. The edge line is composed of: (a) crosses on the centers of neighboring cells of the character matrix and (b) elemental vectors joining said centers (black points of the character are shown in the drawing but white points are simply assumed to exist at all other intersections of the matrix). Strictly, this edge line passes through some of the nearest white points rather than passing between black and white points in all cases. This obviously provides a smoother line. A more precise definition of this edge line is that it connects the centers of all the matrix cells which contain at their corners either (a) only one black point or (b) two adjacent (i.e. not diagonally placed) black points.

Figure 3:
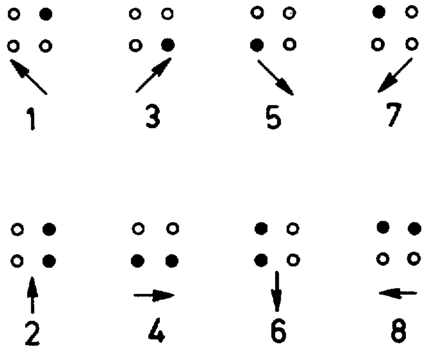
FIG. 3 shows a set of four point edge tracing operators for carrying out in between edge tracing.
Figure 4:
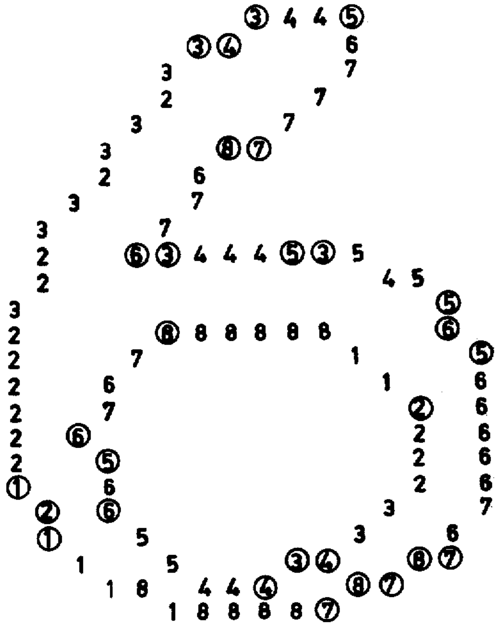
FIG. 4 shows the result of applying these operators to the character of FIG. 1.

This can be regarded as representating the true boundary between the black and white areas. An edge of this type can be produced by the set of eight empirically derived four-point operators shown in FIG. 3. An output is produced by an operator only if all points marked black or white in the operator coincide respectively with black and white points in the pattern. The result is a coded edge in a second matrix which is of the same definition as the original matrix and whose points lie between the points in the original matrix or at the centers of its cells. The second array may be associated with the original array by shifting it diagonally by half a point spacing, this resulting in an edge which is slightly displaced with respect to the original pattern and larger by one cell width horizontally and vertically. FIG. 4 shows the result of applying these operators to the character shown in FIG. 1. Although this set of operators is attractive because only four array points are involved, it produces edge coding in which each standardized vector does not always point correctly to the next edge point. Pointing errors are shown circled in FIG. 4.

Another set of operators which generate an edge lying effectively between black and white, but with correct edge coding, is shown in FIG. 5. These operators have a cruciform area covering twelve points but they only use four or five points, the remainder being ignored by the system regardless of whether they happen to be black or white. As will be seen, the vectorial directions coded as 1-3-5-7 each correspond to only one operator, while those coded as 2-4-6-8 can each be generated by either of two operators. The derivation of these operators will be given hereinafter.

Figure 6:
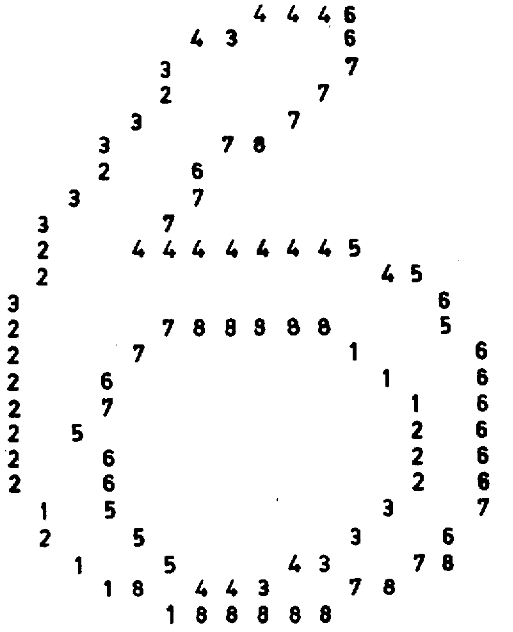
FIG. 6 shows the result of applying the operators of FIG. 5 to the character of FIG. 1.

The result of applying this set of operators to FIG. A is shown in FIG. 6.

It can be formally shown that this second set of operators has the following properties:

1. At any point in the pattern, not more than one operator will match the pattern;
2. The vector associated with any edge point will point to another edge point;
3. From 1 and 2 it follows that all edge points form single-line closed loops without any splitting or branching and without junctions; it also follows that no loop intersects any other loop.

A similar but simpler set of operators possessing the same properties will be derived later for triangular or hexagonal arrays.

In the cruciform case (FIG. 5), the operator form is a triangle containing three points, and the systeme connects together the centers of all the three-point triangles which contain one or two black points of the character.

The operators of FIG. 5 can be used inter alia to improve aan existing character recognition system employing edge tracing as described by P. Saraga, J. A. Weaver and D. J. Woollons in Philips Technical Review 1967, 28 pp 197–203.

Later, circuitry will be described which is suitable for implementing the twelve edge coding operators of FIG. 5. The system is sequential in that the operators act at only one position in the picture at a given time, whereas the computation of the operators within the system is done in parallel: the result of the set of operators is found at any position by processing the input points simultaneously and the results of the individual operators are computed by combinational logic simultaneously. (The system could also employ sequential computation of operators, whereby, similarly to the Mullard Handprint Numeral Recognition machine based upon patent application Ser. No. 672,372, now abandoned, the points covered by the operator are processed one at a time in order to compute the result of the operator, or whereby the computation of the result of the operator is performed in discrete stages). The set of 12 edge coding operators requires 12 adjacent points to be available in parallel from any position in a stored picture. The 12 adjacent points fit into a four-by-four square, and in the system to be described later the effective position of such a four-by-four square of points may be shifted in any one of eight directions by suitably incrementing or decrementing the address counters used in the system. In the examples the edge coding operators are implemented simultaneously by normal combinational logic with their inputs connected to the appropriate points in the four-by-four square. The result of applying the operators at an edge point is to select one unambiguous direction; by moving the position of operation in this direction the next edge point is found, and by continuing the process, the position of operation traces continuously around the edge, since all edges form closed loops without branching. Normally a single circuit of the edge is sufficient; the end point of a single circuit may be detected by storing the address of the starting point and comparing the stored address with the current address. When the addresses are the same, the edge trace is complete. If multiple circuits of an edge were required, the same technique could still be used. More general edge tracing system considerations are discussed later and the implementations described are not confined to parallel processing systems.

In the examples given, the characters used are digitized, i.e. they have been subjected in effect to laying a matrix of cells consisting of regularly disposed rows and columns of character element areas over the original character and assigning a numerical value to each element of the matrix depending on the total amount of "blackness" or "whiteness," however disposed, in the area of the element. Only two numerical values are permitted, the binary values 1, and 0, and 1 being assigned to elements at or below a threshold level of light emitted by the element, and thus defined as character elements and 0 to elements above this threshold and thus defined as background elements. Thus, the character is digitized in two respects. Firstly, shades of "grey" are eliminated, and secondly, the character edges are now defined stepwise, the minimum step being an element dimensions. Also, co-ordinate numbers can be assigned to each element along with the binary value of that element, and the character now exists in purely numerical form, being a list of the coordinate values of each character element and its associated binary value. It can then be handled and processed by computer methods which may be completely divorced from the original geometrical outline of the character.

There will now be described circuitry suitable for implementing the twelve edge coding operators of FIG. 5.

The binary pattern to be processed is held in a two-dimensional array of, for example 32 × 32 bits of storage. This can be organized into 16 stores of 64 bits each. (This type of high-speed store is commercially available; e.g. as 16 × 4 TTL units type Texas SN 7489). It is then possible to arrange the stores so that any 4 × 4 group of points in the array can be accessed simultaneously. FIG. 7 shows part of such a store arrangement. Each point of the pattern has an address which comprises:

a. the store in which the point is held (i.e. the store address) this being shown as a letter from A to P representing one of the 16 stores; and
b. a number which represents the address of the bit required in that store, i.e. the bit address.

The bit address is a two-digit octal number (i.e. within the range 0–7); the first digit is the Y address and the second digit is the X address. The digits go from 0 to 7 in both the X and the Y direction (e.g. from A00 to A07 in the first column and from A00 to A70 in the first row). this gives the total number of bits of storage in each store as 64. In FIG. 7, any square of 16 points contains every store address once only, so that positioning a 4 × 4 operator at any point in the array is a matter of generating the correct store and bit addresses for each of the points in the operator.

Figure 8:
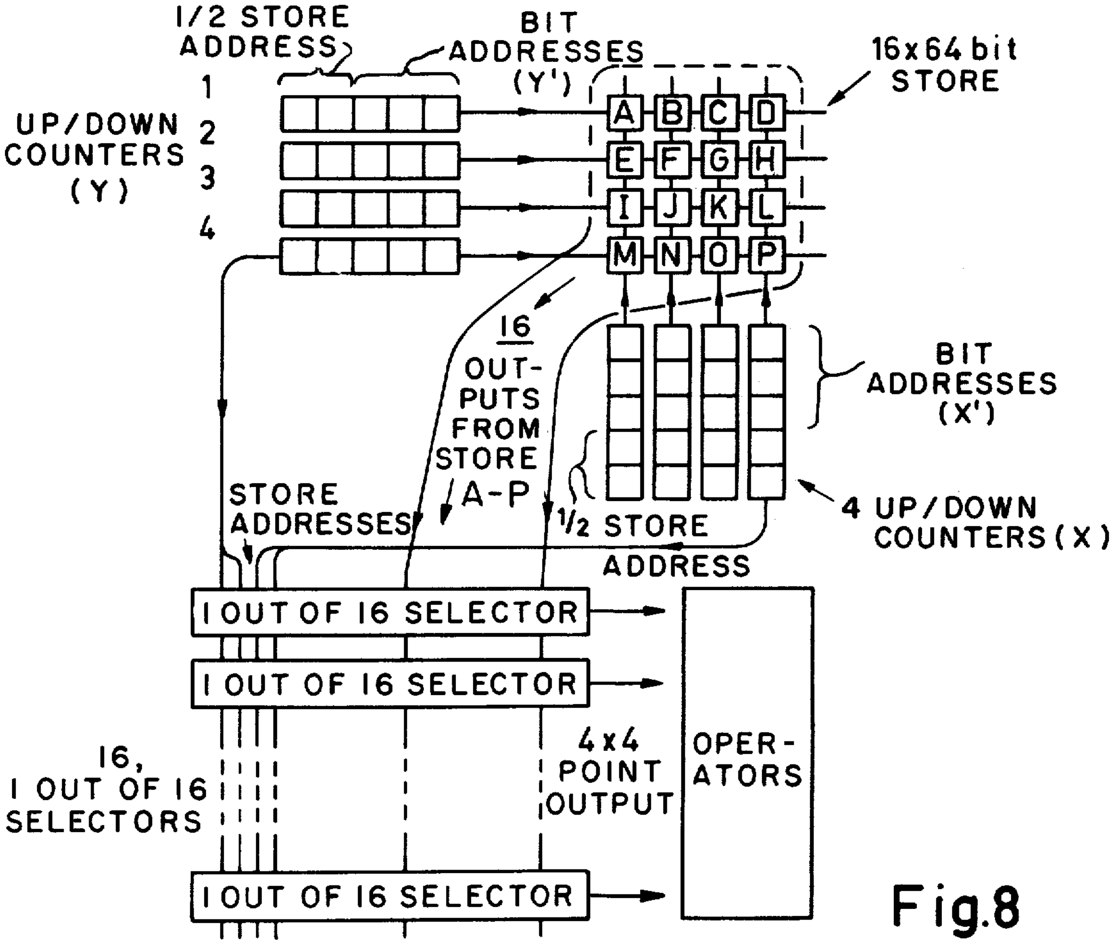
FIG. 8 shows address generation means for the array of FIG. 7; the 16 outputs from the stores A–P are only indicated schematically and are common to the 16 selectors.

FIG. 8 shows a method of generating the addresses. There are four 5-bit up/down/counters for each axis. (The purpose of these is explained later). These counters are incremented upwards or downwards according to the direction of shift of the operating point required, by circuitry not shown. The co-ordinates of the operating point may be associated with one of the four Y counters and one of the four X counters, in this case with the lower and right hand counters respectively. As the operator point moves, there are 16 possible arrangements of store addresses within the 4 × 4 area of operation, and the particular arrangement is specified by the two least significant bits of the X and Y co-ordinates. These 4 bits are used to connect each store output to the correct point in the operator by means of the 16 1-out-of-16 selectors.

The bit addresses of the stores are generated using the three most significant bits of the X and Y counters. In the case of store P these are the same as the X and Y co-ordinates as defined above. These six bits are sufficient to define which of the 64 bits in store P is required. If the co-ordinates of a point are X, Y let the required bit address be $X'_p$, $Y'_p$. For store P, $X'_p = X/4$ (remainderless division implying the 3 most significant bits of X are X') and $Y'_p = Y/4$. This simple relationship is not true for the other stores, however. For example $Xj = (X + 2) / 4$ and $Yj = = (Y + 1) / 4$. The necessity to add to the co-ordinates may be avoided by using the four counters (as shown) for each axis with the contents of each staggered by 1 from the next one. In other words they contain between them X, X +1, X + 2, X + 3, Y, Y +1, Y + 2, Y + 3. The top three bits of these may be used directly as appropriate to specify the bit addresses of the stores.

A second type of store arrangement is shown in FIG. 9. Not only does this satisfy the previous requirement, i.e. that in any block of 4 × 4 points each store is used once only, but also the same applies to a horizontal block of 16 by 1. This may be useful in a practical system because of half line of information (16 bits)may be input to the store in one operation, so that the time required for reading information into the store is minimized (in character recognition systems information is usually available as a sequence of points along successive lines of a picture),.

For this arrangement of the store the problem of generating the store and bit addresses is complicated by the stepping upwards from left to right of the addresses. In terms of the store addresses, a block of 4 by 4 at $(x, y)$ is repeated at $(x, y + 4)$, $(x, y + 8)$, etc. downwards as before, but horizontally at $(x + 4, y - 1)$, $(x + 8, y - 2)$ etc. If $X' = X / 4$ (as above) and $Y' = Y / 4$ then the store address supplied to the 1out-of-16 decoders is given by $x = y$ (modulo 4) (as before) by $y = (Y + X')$ (modulo 4).

This is the same as $[(Y + X'(\text{modulo } 4))]$ (modulo 4). This means that for every four spaces to the right, the Y address changes by 1, which is as required. In practical terms, referring to FIG. 8, instead of the Y address being used directly in the 1-out-of-16 selectors, it is added with the second and third most significant bits of the X address in a two-bit adder. The output of the adder is used with the two least significant bits of the X address as the required four-bit input to the 1-out-of-16 selectors.

Figure 10:
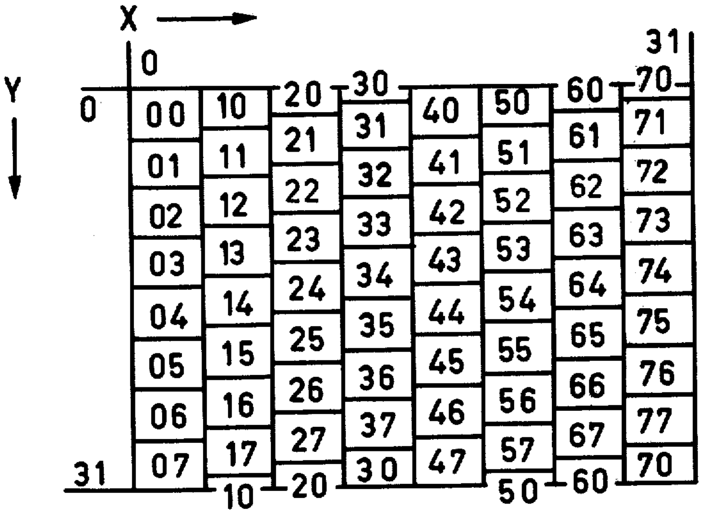
FIG. 10 shows the bit addresses of the store P of FIG. 8 (complete array as required for 4 × 4 operator)

FIG. 10 shows the bit addresses required for store P. Each numbered box covers an area of 4 × 4 points with the same P address. In this case $X'p = Xp/4$ as before but $$Y'p = \frac{<Yp + X'p\ (\text{modulo } 4)>}{4}$$

The term X' (modulo 4) implies that the cycle length of the variation of $Y'p$ with $X'p$ is 16, rather than 32, so that the fifth column in FIG. 10, has the same Y address as the first column. In hardware terms, the second and third most significant bits of $Xp$ must be added to $Yp$, and the three most significant bits of the result used to specify the Y' bit address of store P. The additional counters for other stores are used in precisely the same way as previously to generate addresses for the other stores, except for the inclusion of an adder for generating each Y'bit address. X' bit addresses are generated using the same circuit as proviously. The whole system is shown in FIG. 11.

In the input (or output) of a 16 × 1 half-line of information address generation is simplified because normally only a left or right half-line is required: referring to FIG. 9 again, only four arrangements of store addresses in one half-line are possible. Also, only 64 positions of the half-line in the array are required. These positions could be ordered, top left, top right, second left, second right, third left etc. down the array. For read-in of information each store in the array can only "see" four points of the 16 input points, so that each store requires a 1-out-of-4 selector; all the selectors may be driven by two bits. These would be the fourth and fifth bits of the six-bit counter required to count the 64 positions of the half-line; the last bit determines whether the half line is to the left or right, and in either case the store address arrangement is the same. The bit addresses of the store P are ordered as shown in FIG. 12. If the bits of the 6-bit address counter are $u$, $v$, $w$, $x$, $y$, $z$, then the required $X'p$ and $Y'p$ are $z$, $\bar{x}$, $\bar{y}$ and $u$, $v$, $w$. Stores M, N, O always have the same bit address as store P; there are four groups of four stores which have the same bit address; the addresses are staggered as before so that a simple implementation is to have one counter for each group of four stores. The system is shown in FIG. 13. It should be noted that by reversing the 1-out-of-4 selectors, information may be read out (using the same circuit otherwise) in successive half-lines. (The three pairs of lines S lead to three more sets of four 1-out-of-4 selectors identical with the set shown at the left of FIG. 13 and relating to the other 12 points in the 16-bit input register. Also, the fourth and fifth output from each counter carries a circular sign indicating inversion of the binary output).

It is possible to use an alternative arrangement for 4 × 4 operator output and 16 × 1 half-line input. The store may be as FIG. 7, but using 64-bit stores organized as 16 words of four bits each. So each 64 × 1 bit store of FIG. 7 is replaced by a 16 × 4 bit store combined with a 1-out-of-4 selector as shown in FIG. 14 (the store has four parallel inputs and four parallel outputs while Y' and X' are address lines). The half-line input to the array is as shown in FIG. 15. By incrementing the three Y' bits and the most significant X' bit the store can be cycled through half-line by half-line. A 1-out-of-4 selector is required to select which row of stores (A B C D, E F G H, etc.) is written into, said selector being controlled by the least significant Y' bit and the most significant X' bit. So only one counter is required because all stores have the same address.

A general purpose picture processing system, not confined to edge tracing, may be based on this type of store organization. The particular store organization described above was for a 4 × 4 operator acting on a 32 × 32 picture, but these parameters can be varied. Also, jumps to neighboring positions only are allowed; a more flexible system could use registers and adders to replace the counters to allow true random access. The number of bits per point can be increased, and provision made for writing as well as reading at the operator position. This will allow multilevel pictures to be operated on, i.e. patterns involving more than one bit per point to cope, for example with shades of grey. Two or more operators at different positions could operate on a picture simultaneously with restrictions on their relative position to prevent them accessing the same store at the same time. New information could be written into the array cyclically, say half-line by half-line, during the processing of the picture provided that the operator had kept away from the boundary line between new and old information. More than one operator may be connected to a single group of outputs from the store. Store arrangements for two or more differently-shaped operators can be provided.

Further edge tracing system considerations can usefully be discussed at this point.

The aforesaid Mullard Handprint Numeral Recognition (HNR) machine has five modes of operation concerned with edge tracing. These are:

1. Loading the scanned picture into the store.
2. Searching for outside loops.
3. Tracing outside loops as they are found by (2).
4. Searching for inside loops.
5. Tracing inside loops as they are found by (4).

It is convenient to implement (1) by writing a half-line or a full line at a time. A way of organizing the store to achieve this was described above. This then allows edge searching/tracing to be virtually a continuous activity with short breaks while a new half-line or line is written in. This is desirable in a practical system because of the advantages offered by a solid state camera system for scanning the input characters; the mechanical scanning used in these camera systems precludes a random access scan such as is used in the present flying-spot scanner. for fast character recognition systems the characters must therefore be read-in and processed simultaneously, unless the characters are known to be well separated.

The distinction between searching/tracing inside or outside loops is not necessary because the complete list of jump directions found after one trace of the edge contains this information. The information is given by the sum of the changes in direction around the complete edge. This is not the same as the sum of the differences between sequential pairs of jump directions. The sum will indicate a complete lap or circuit either clockwise or counterclockwise, which may then be used to decide the importance of the particular edge.

The way in which the information is used depends on the nature of the processing following the edge tracing; the edge can be retraced if required to provide a list of jump directions, or the first trace can have already generated a stored list, to be discarded if, say, the edge is found to be an inside edge.

The searching for either inside or outside edges in the present Handprint Numeral Recognition machine is done by examining the picture line by line to find black points, and deciding whether or not to enter the trace mode on the basis of whether a given point is an edge point, whether it is an inside or an outside edge point, and whether it has previously been traced or not by referring to a second stored picture in which edge points are marked as they are traced. A similar procedure can be used, except for the necessity of deciding on the type of edge. The disadvantage of providing a second array in which to mark the edge points is that the store requirement is doubled.

A way of avoiding this is to restrict the entry to an edge to a very small number of points, detecting these points as the picture is scanned and written in, storing the co-ordinates of these points, and later edge tracing starting at these points. If more than one point lies on a single edge, the latter point co-ordinates could be deleted as they are found during the trace. The practical use of this technique will be limited if the additional storage for the point co-ordinates approaches the storage required for the marked edge points.

An example of a way of selecting edge starting points is the following: consider two successive scanned lines of points. If there is a connected row of black points in the second line, none of which is connected to a black point in the first line, the row of black points is the start of a new edge. The co-ordinates of, say one, end point of the row of black points may be stored as a starting point for edge tracing. New white rows may also be found and their positions stored. The exact co-ordinates stored should take account of the positioning of the imaginary edge between the original array points. The resulting system then operates in all of the present modes (1) to (5) simultaneously.

A remaining problem is the association of inside loops with a particular outside loop. This may be solved by restricting the minimum size of inside loops and allowing only one outside loop of sufficient size to contain any inside loops to be present in a given picture. In a continuous system this would not be in itself satisfactory because two characters might appear legitimately within the same picture. It may be necessary to associate some positional information with each loop found in order to allow this. For example, the extremes of movement of the operating position as an edge is traced could be stored, defining a rectangle containing the character in which the loop size conditions above must apply.

The operators of FIG. 5 which are applicable to a particular matrix or array are thus dependent on the topology of that array. In order to derive these operators from first principles it is necessary to escape from the constraints of a particular topology and to develop a more general algorithm for edge tracing. It is useful to begin by examining the edge tracing process when it is applied to a field of randomly positioned points as shown in FIG. 16*a*. The general algorithm can then be used to synthesize a set of operators for any particular array topology.

The object of edge tracing is to follow the boundaries between black and white areas. In a random array of points however, no areas are explicitly defined. By introducing a concept of neighbors it is possible to define areas in terms of sets of points. An area is defined as a set of points having the same "color" (i.e. black or white) such that any two points in the set may be joined by a path, each step of which is a link between two neighbors in the set. A suitable definition of neighbors, based on Euclidean distances between points, is the following, which is given as an advantageous example:

A pair of points are neighbors if there exists no other pair of points in the array which satisfies both the following conditions:

a. The second pair of points are closer together than the first.

b. A straight line drawn between the second pair of points intersects one drawn between the first pair.

This definition will produce ambiguity when the two intersecting straight lines have the same length. Special rules must be introduced in order to resolve this ambiguity; their application to rectangular arrays will be discussed later.

Using the above definition of neighbors, straight line links can be inserted between all pairs of neighboring points. This divides the space between the points into triangles with a point at each vertex, a shown in FIG. 16*b*.

The process of defining neighbors and triangulating has not yet involved a distinction between black and white points. The introduction of this distinction, FIG. 16*c*, results in three types of triangle:

a. Those with three black vertices.

b. Those with three white vertices.

c. Those with black and white vertices.

Figure 16C:
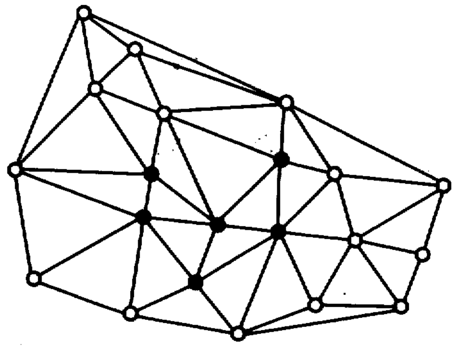
Figure 16D:
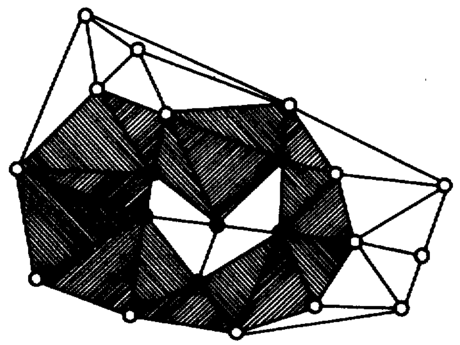

The third type of triangle lies on the boundary between black and white areas in the array; these will be referred to as edge triangles (FIG. 16*d*).

An arbitrary decision must be made about the direction of rotation of the operating point around an area. All the operators in this paper assume clockwise edge tracing around a black area.

Figure 16E:
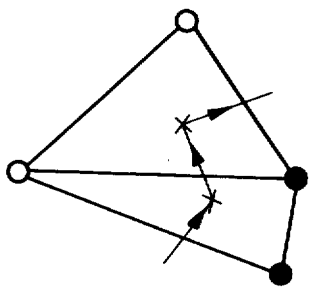
Figure 16F:
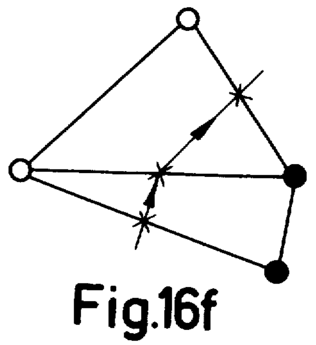

Two of the sides of each edge triangle join a black point to a white point. Viewed from inside the triangle one of these sides has the black point at the left end, the BW side, and the other has the black point at the right end, the WB side. Edge tracing proceeds by moving the operating point through a succession of these triangles, entering each one through the BW side and leaving through the WB side. If the edge points are considered to lie within each edge triangle, an edge of the type shown in FIG. 16*e* is found. Alternatively the edge points may be considered to lie on the sides of the triangles through which the operating point passes, as shown in FIG. 16*c*.

The edge described above may be shown to possess the properties listed above as the properties of the cruciform operators. A single direction may be associated with each edge triangle; that is the direction in which the edge leaves the triangle. In an infinite field of points, the triangle indicated by the exit direction must be an edge triangle since it shares a black-white side with the original triangle. Since the sequence of edge triangles has no end, the edge will form a closed loop. The shape of the black area enclosed by the edge depends upon the definition of neighbors and the triangulation. Another definition of neighbors would have produced a different triangulation. The same edge tracing algorithm could still be used producing a differently shaped edge.

The rules which have been formulated for edge tracing in a random array may be applied to a regular hexagonal array of points. Each point has six neighbors, and as before, linking all the neighbors produces a field of triangles. The triangles may be divided into two types, A and B, according to orientation as shown in FIG. 18. An edge passes alternatively through A and B triangles, and for any two successive A triangles, there is only one possible B triangle. The B triangles are therefore redundant for specifying the position of the edge, and operators for directing the edge from one A triangle to the next can be derived. These operators will be synthesized by examining all possible edge paths from an A triangle.

The triangle in FIG. 19*a* is an A type edge triangle. The edge must pass from this triangle into a type B triangle FIG. 19*b*. The exit direction from the B triangle depends on the point $\alpha$. The two possibilities are shown in FIGS. 19*c* and 19*d*. The edge has now reached a neighboring A triangle. By comparing FIGS. 19*e* and 19*f* with FIG. 17 it can be seen that two of the hexagonal operators have been synthesized. The remaining four are simply rotations of these two and correspond to edge paths of the remaining four neighboring A triangles. FIG. 20 shows a pattern on an hexagonal grid and edge coding produced with the operators shown in FIG. 17.

The application of the simple edge tracing rules to rectangular arrays is more interesting. Additional rules are needed for defining neighbors and triangulating. The four points immediately above, below, to the left and to the right of any given point will clearly be neighbors. For any elementary square of four points however, only one pair of diagonally opposite points may be neighbors. Since the length of each diagonal is the same, new rules are needed to determined the neighbors.

The concept of neighbors introduced above is very closely related to that of connected points. The connectivity of rectangular arrays is usually defined by introducing rules based on the colors of the points in the pattern. So in a pattern with 8 fold black connectivity for example, diagonal links between black points are allowed at the expense of diagonal links between white points.

Similarly, the diagonal neighbor problem can be resolved by taking into account the "colors" of the points involved. Priorities can be assigned to the three types of possible neighbor pair; black-black, white-white, and black-white. In any elementary square, the diagonal with the highest priority is linked. There are three types of elementary squares in which both diagonals have the same priority: all black, all white, and those where both diagonals are black-white. Only the last of these is involved in the edge, and it will be seen that the path of the edge is unaffected by which diagonal is linked.

FIG. 21 illustrates the effect of the priority order black-black, black-white, white-white, on the triangulation of elementary squares. The edge points for the operators of FIG. 5 are at the centers of elementary squares, and the operators direct the edge from one such edge point to the next one. In FIGS. 21*a*, 21*b* and 21*c* the edge passes through the center of the elementary square because there is a black-white diagonal link. The passage of the edge through the elementary square of FIGS. 21*b* and 21*c* is therefore identical. In FIGS. 21*d* and 21*e*, the black-black diagonal has priority, and so the edge does not pass through the center of the square. The requirement for the center of an elementary square to be an edge point is, therefore, that there is a black-white diagonal link.

Using the same ordering of priorities, we can examine the possible edge paths leading away from a known edge point at the center of a square. By following the edge paths until they pass through a second black-white diagonal, all possible jumps from one edge point to another may be found. After leaving an edge point the edge must pass through a black-white side of the elementary square containing the edge point, as shown in FIG. 22*a*. The general form of edge point for the current priority order is given by a combination of FIGS. 21*a* and 21*b*. In FIG. 22*a*, therefore, $\alpha$ is white and $\beta$ can be either color.

The path taken by the edge on leaving the first square is determined by the value of point $\gamma$ in FIG. 22*b*. If $\gamma$ is white as in FIG. 22*c*, the edge encounters a black-white diagonal which is a second edge point as defined above. The path between two successive edge points is complete. If $\gamma$ is black, however, the second square has a black-black diagonal, and the edge is forced upwards through the white point boundary as in FIG. 22*d*. Its path then depends on the point $\delta$. If $\delta$ is white, an edge point has been found because there is a black-white diagonal irrespective of the fourth point in the square. If $\delta$ is black however, the edge passes into a fourth square which again must have a black-white diagonal, so that another edge point has been found.

There are, therefore, just three patterns of points, FIGS. 21*c*, 21*d* and 21*e*, which give rise to edge paths joining two adjacent edge points. These and their three rotations are the original rectangular operations of FIG. 5.

By changing the priority order, it is possible to generate other sets of operators. For example, the order: black-white, black-black, white-white results in the set of operators shown in FIG. 23. These operators produce the edge coding shown in FIG. 24, when applied to FIG. 1. This set of operators includes the interesting case of an isolated edge point for which the edge path is directed back to the original point.

Another possible order of priorities is: black-black, white-white, black-white. This appears to produce edge tracing operators for which successive edge points are not necessarily adjacent.

Because the operators can be used in parallel and produce edge coding in an array of the same definition as the original, they are also suitable for use with parallel processing machines. It is also possible to apply the concepts described in this specification to processes other than edge tracing.

It will be appreciated that the geometry of the arrays of points as applied to the character by the act of scanning, for example, need not be rigorously hexagonal or square. For example, the set of points stored in square array may have been generated from an array whose cell unit is a parallelogram. That is, the spacing of the rows and columns need not have been equal and the rows need not have been accurately at right angles to the columns.

It will also be appreciated that an advantage of operators which, having found one edge point, and then point correctly to the next one is that edge tracing is speeded up. Once one edge point on each continuous area of the pattern has been found, the edge of each such area can be traced without wasting time in searching around each edge point to find the next. However, in spite of this advantage, it may be preferable in some cases to apply correctly pointing operators to the entire pattern and background matrix. One example is an alternative implementation involving storing the edge codes, rather than the digitized pattern picture, in a two dimensional array. This is done by using the operators to generate edge codes for all points in the array of pattern and background points and writing these codes directly into each successive point of the store. Since there are eight edge directions, three bits are required to code these, and the main store must have three bits at every point. Edge tracing is then a matter of accessing a point in the store, and incrementing the address registers of the store appropriately according to the direction code found at that point. The next edge point is then accessed, and so on until the edge trace is complete.

This implementation requires three times as much storage capacity as the original 16 point implementation, but is more economical in terms of associated logic and may, therefore, be preferable in a real machine. The implementation relies on the property of the operators that there is a single edge code at any point in the field.

This alternative implementation can be carried out conveniently when the points of the digitized pattern are derived from the original pattern in sequence by a scanning action. The incoming pattern and background digits pass through four columns of shift registers connected in series, each column having as many stages as there are digits in one linear scan of the pattern and background. The top four stages of each of the four columns provide the square array of sixteen points to which the set of operators can be connected in parallel. Only one of the operators will give an output indicating an edge direction at any one time. This direction, being one of eight possible directions, is then encoded into three binary digits which are then written into the appropriate place in the store.

What is claimed is:

1. A method of recognizing a character of varying stroke width comprising the steps of:

a. storing digital electrical signals identifying the shape of the character in a first matrix of storage cells whereby a character cell is distinguished from a background cell position by the presence of a digital signal;

b. sensing the digital signal characteristics of a predetermined group form of storage cells starting from a first predetermined group and sensing the condition of all cells within that group;

c. assigning for said sensed group of cells an appropriate operator, said operation being selected from a predetermined set of unique operators, said assigned operator establishing the center of said group and an associated vector direction for said group, said center being an interstitial point between cells of said group;

d. establishing the next group of cells whose digital information is to be sensed by employing the center and vector direction information of said first group of cells;

e. determining and storing in a second matrix a shifted edge line by repeated application of said sensing, assigning and establishing steps in a complete circuit of said character, said shifted line lying between the outermost character cell positions and adjacent background cell positions;

f. comparing said shifted edge line with a standard edge line in order to recognize the character.

2. A method as claimed in claim 1 wherein the form of said predetermined group form of storage cells is a 2 × 2 square block of cells, and either an operator having vector direction along the diagonal formed by two oppositely positioned background cells is selected when a group having one character cell and three background cells occurs or an operator is selected having a vector direction along the line through two character cells when a group having two adjacent character cells and two background cells occurs.

3. A method as claimed in claim 1, wherein the form of said predetermined group form of storage cells is a first triangle of six cell positions and said set of operators being chosen upon receipt of three cells which are arranged in a second triangle in a corresponding triangular orientation as said first triangle, said operators initially selectable upon first receiving indication of at least one character position and one background position within a triangle which does not form an edge of said first triangle, said operator being then selected for the assignment of an elementary edge vector originating in the center of said first triangle and being directed parallel to a line connecting two corresponding positions within said second triangle.

4. In a method for determining an edge of a character figure which is imaged on a two-dimensional pattern of positions arranged along rows and columns whereby a character position is distinguished from a background position by the presence of digital information, said method comprising the steps of;

sensing the information of a 2 × 2 block of positions;

applying said information to a number of operator-forming logical means;

generating by use of said operator-forming logical means upon reception of a single character position and three background positions an elementary edge vector along the diagonal formed by the two oppositely positioned background positions; or generating by use of said operator-forming logical means upon reception of two adjacent character positions and two adjacent background positions an elementary edge vector along the line through said two character positions;

sensing and storing the output signals of said operator-forming logical means;

repeating all of the above steps for groups of cells along the edge of the character.

5. In a method for determining an edge of a character figure which is imaged on a two-dimensional pattern of positions arranged along rows and columns whereby a character position is distinguished from a background position by the presence of digital information, said method comprising the steps of:

sensing the information of twelve positions that are arranged according to a 4 × 4 matrix minus the four corner positions;

applying the information of a number of positions thereof which are arranged within a cross to one of a number of operator-forming logical means;

enabling said operator-forming logical means upon reception of a single first character position and two adjacent background positions within the three positions forming part of a central 2 × 2 block of said 4 × 4 matrix;

activating an enabled operator-forming logical means alternatively upon reception of three background positions lying in-line for generating an elementary edge vector along said line;

or activating an enabled operator-forming logical means upon reception of two further character positions within said cross for generating an elementary edge vector along two opposite positioned character positions within said cross;

or activating an enabled operator-forming logical means upon reception of a further character position and a further background position within said cross, the three background positions forming an L shape for generating an elementary edge vector along a connection line connecting the two character positions within said cross;

sensing and storing the output signals of said operator-forming logical means; and repeating all of the above steps for groups of cells along the edge of the character.

6. In a method for determining an edge of a character figure which is imaged on a two-dimensional pattern of positions arranged along rows and columns whereby a character position is distinguished from a background position by the presence of digital information said method comprising the steps of:

sensing the information of a block of 4 × 4 positions, which are consecutively numbered from 1 to 16 along rows and columns, the value 1 being assigned to a character position and the value 0 to a background position;

applying the information of a number of positions within said block to one of a number of operator-forming logical means;

activating said operator-forming logical means for generating elementary edge vectors originating from the center of said block, said elementary edge vector being directed towards the position 1 if the function $(1+\bar{5}).2.\bar{3}.\bar{6}.7.(\bar{10}+11)$ is "true," said elementary edge vector being directed towards the center between positions 2 and 3 if the function $(\bar{2}+3).\bar{6}.7.(\bar{10}+11)$ is "true," said elementary edge vector being directed towards the center between positions 2 and 3 if the function $(2+\bar{6}).3.\bar{4}.\bar{7}.8.(\bar{6}+10).11.\bar{12}$ is "true," said elementary edge vector having a zero length so that an isolated edge point is found if the function $(\bar{2}.3.\bar{4}.6.\bar{7}.8.10.11.\bar{12})$ is "true," the other isolated edge points and elementary edge vectors being found by cyclic changing of the axis directions and the position information;

sensing and storing the output signals of said operator-forming logical means; and repeating all of the above steps for groups of cells along the edge of the character.

7. In a method for determining an edge of a character figure which is imaged on a two-dimensional pattern of positions whereby a character is distinguished from a background position by the presence of digital information, said method comprising the steps of:

sensing the information of six positions that are arranged in a first triangle;

applying the information of three positions of said first triangle which are arranged according to second triangles, said second triangles being correspondingly oriented as said first triangle, to operator-forming logical means;

enabling said operator-forming logical means upon reception of at least one character position and one background position whithin a second triangle that does not form an edge of said first triangle, said enabled operator-forming logical means being operative for generating an elementary edge vector originating in the center of said first triangle and being directed parallel to a line connecting two corresponding positions within an enabling second triangle;

sensing and storing the output signals of said operator-forming logical means; and repeating all of the above steps for groups of cells along the edge of the character.

8. A method as claimed in claim 2, wherein the total number in said set of unique operators is eight.

9. A method as claimed in claim 1, wherein the form of said predetermined group form of storage cells is a cruciform comprising a group of twelve storage cells arranged according to a 4 × 4 square block minus the four corner positions and said set of operators being selectable upon initially receiving indication of a single character cell position and two adjacent background cell positions within three cell positions forming part of a central 2 × 2 square block of said 4 × 4 matrix, said operators being selected upon receipt of either:

a. two further character cell positions within the cruciform for determining an elementary edge vector parallel to two oppositely positioned character cell positions within the cruciform, or b. a further character cell position and a further background cell position within the cruciform, the three background cell positions forming an L shape for determining an elementary edge vector parallel to a connection line connecting the two character cell positions within the cruciform; or c. three background cell positions in a line for determining an elementary edge vector parallel to that line.

10. A method as claimed in claim 9 wherein the total number in said set of operators is 12.

11. A method as claimed in claim 3 wherein the total number in said set of operators is six.

* * * * *

UNITED STATES PATENT AND TRADEMARK OFFICE

CERTIFICATE OF CORRECTION

PATENT NO. : 3,899,771

DATED : August 12, 1975

INVENTOR(S) : PETER SARAGA ET AL

It is certified that error appears in the above-identified patent and that said Letters Patent are hereby corrected as shown below:

Column 1, before line 7, insert as a separate paragraph the following: --The invention relates to a method of determining the edge of a character which is applied on a two-dimensional pattern of positions, in which a character position is distinguished from a background position by digital information present.--

Column 2, line 10, change "bours" to --bors--; line 51, change "6" to --$\bar{6}$--; line 57, change "inforamtion" to --information--.

Column 3, line 39, change "in between" to --in-between--; line 62, change "acts" to --act--.

Column 4, line 11, change "16a-16b" to --16a-16f--.

Column 5, line 23, after "point;" add --and--; line 37, change "aan" to --an--.

Column 6, line 26, change "1" to --'1'--; "0" to --'0'--; and "1" to --'1'--; line 29, after "elements" add --,--; change "0" to --'0'--; line 34, change "dimensions" to --dimension-- line 46, after "example" add --,--; line 65, change "this" to --This--.

UNITED STATES PATENT AND TRADEMARK OFFICE

CERTIFICATE OF CORRECTION

PATENT NO. : 3,899,771

DATED : August 12, 1975

INVENTOR(S) : PETER SARAGA

It is certified that error appears in the above-identified patent and that said Letters Patent are hereby corrected as shown below:

Column 7, line 56, change "l" to --l---.

Column 8, line 22, change "proviously" to --previously--; line 51, change "S" to --"S"--.

Column 9, line 18, after "example" add --,--; line 50, change "for" to --For--.

Column 12, line 36, change "determined" to --determine--.

Claim 5, line 30, change "L" to --"L"--.

Claim 6, lines 41, 44, 47, and 50, change ""true,"" to --"true",--.

Claim 9, line 17, change "L" to --"L"--.

Signed and Sealed this

Twenty-seventh Day of July 1976

[SEAL]

*Attest:*

RUTH C. MASON
*Attesting Officer*

C. MARSHALL DANN
*Commissioner of Patents and Trademarks*